Patented Mar. 26, 1946

2,397,399

UNITED STATES PATENT OFFICE 2,397,399

SYNTHETIC RUBBERLIKE MATERIALS

William Baird, Bernard James Habgood, David Augustine Harper, and James Allan Hendry, Blackley, Manchester, England, assignors to Imperial Chemical Industries Limited, a corporation of Great Britain No Drawing. Application May 3, 1944, Serial No. 533,938. In Great Britain March 11, 1943

8 Claims. (Cl. 260—92.7)

This invention relates to improvements in the curing or vulcanisation of polychloroprene synthetic rubber and more particularly to the use as curing or vulcanising agents of certain substances specified hereinafter.

By polychloroprene synthetic rubber we mean the rubber-like materials which are obtained by the partial polymerisation of 2-chlorobutadiene-1:3 and of mixtures of the same with minor proportions of other polymerizable substances which are employed to modify its characteristics, such as those polymerizable substances which contain two carbon atoms in an open chain joined by more than one bond such as butadiene, methyl acrylic acid nitrile and methyl methacrylate, described in British Patent 497,638.

The chloroprene synthetic rubber, which will for convenience be hereafter referred to as polychloroprene rubbers, can be converted to substances resembling vulcanised natural rubber by a process somewhat analogous to that by which natural rubber is vulcanised, e. g., by heating, preferably in the presence of small proportions of one or more of the following, viz., magnesia, zinc oxide, litharge, sulphur, wood rosin, pine tar and the organic vulcanisation accelerators which are used for natural rubber. This process of vulcanising or curing probably consists in large part of a further polymerisation of the material.

The substances above-mentioned are not the only ones which have a vulcanising action. Zinc chloride has a powerful vulcanising action and we have found that the anhydrous halides of boron and of divalent and polyvalent metals are also vulcanising agents for these chloroprene rubbers, and that they have advantages over the above-mentioned curing agents in that they yield vulcanised products having greater tensile strength and/or other improved physical properties. These halides, however, have in fact rather too powerful a vulcanising action for manufacturing purposes, in that they cause vulcanisation to take place too quickly, so that, for instance, vulcanisation or partial vulcanisation takes place so soon after the addition of the halide to the rubber or mix containing it, or at such a low temperature, that the subsequent milling and shaping operations are prevented or deleteriously affected by the resulting partial or complete loss of plasticity in the rubber. This action of the halides is analogous to the "scorching" action of certain fast vulcanisation accelerators on natural rubber.

We have now found that the powerful vulcanising action of these halides can be restrained and their scorching propensities removed, if they are additively combined with suitable organic compounds, especially nitrogenous organic bases, but excluding hydrazine compounds and that these additive compounds are, in general, not only very convenient substances for incorporating into the chloroprene rubbers, in that they are less liable to cause scorching than substances previously employed, in the trade, but that they also yield vulcanised products which show improved resilience, improved tensile strength and/or other improved physical properties as compared with vulcanisates obtained with substances previously employed, or that they show advantage in other ways. The properties conferred by the additive compounds vary to some extent with the halides and organic compounds from which they are derived, and as a consequence, in addition to the advantages obtainable with any particular additive compound, the use of the new class of curing agents has the general advantage of introducing greater variety into the vulcanisates obtainable from these chloroprene rubbers and greater flexibility into the processes by which they may be obtained.

It is believed that the activity of the additive compound is due to thermal dissociation into halide and organic compounds and that the actual degree of safety obtained is dependent at least in part on the thermal stability of the compounds.

The organic compounds which are used in the production of the new vulcanising agents do not in general have only what may be called the negative function of restraining the action of the halide, they have also in many cases an effect of their own on the properties of the vulcanisate, which effect is frequently similar to the effect of the organic compound, when used as a separate ingredient in a mix using the normal vulcanising agents.

The performance of our invention, however, does not depend upon any theory as to the chemical actions which are taking place in the vulcanisation process, nor is the invention limited thereby.

We have found that the normal vulcanising agents can be used along with the additive compound accelerators, if desired.

Our invention accordingly consists of a process for the vulcanisation of chloroprene synthetic rubber, which comprises the addition to the rubber-like material of an additive compound of an anhydrous halide of boron or a divalent or polyvalent metal which halide in the anhydrous form has scorching properties, and an organic compound capable of combining therewith, excluding hydrazine compounds, the organic compound being so chosen that the resulting additive compound is non-scorching. The invention also consists of compositions containing the said additive compounds and vulcanised products obtained therefrom.

It will be seen that the anhydrous halides from which the additive compounds are obtained, include the halides which are used in the Friedel-Crafts reaction and other halides which are similarly used as catalysts in other organic chemical reactions: some of the halides are commonly referred to as acid halides, their halogen atoms reacting in many cases like the halogen atoms in halides of organic acids rather than like those in inorganic halides when ionised in water. Among the additive compounds which are more generally applicable in our invention, there may be mentioned those derived from halides of aluminium, antimony, boron, cadmium, chromium, cobalt, copper, iron, lead, manganese, nickel, tin and zinc, and those derived from basic nitrogenous organic compounds, particularly aliphatic and aromatic amines, amides and thioamides.

In speaking of additive compounds we mean compounds which are obtained by or obtainable by chemical combination between the aforesaid halides and the organic compounds, without loss of by-product. Ordinarily, the additive compounds will be compounds obtainable by combination between equimolecular proportions of the aforesaid halides and the organic compounds, or by combination in some other simple molecular ratio. We do not postulate any particular internal structure in the additive compound, as insufficient is known with certainty of the structure of such compounds to make this possible. In particular we do not imply by the use of the word additive that the halide and the organic compound from which the additive compounds are derived are combined in such a way that the halide and the organic compounds are joined in the additive product, without substantial disturbance of the valency bonds of the individual halide and organic compounds: nor do we exclude such a possibility. In many cases, especially where the halide and the organic compounds are capable of combining in two or more different molecular proportions the compounds may be prepared most readily in ways which yield a mixture of additive compounds, perhaps with some unreacted starting material. It may not be necessary to remove uncombined organic starting material, especially if it is an organic base, or even to remove an excess of halide provided the amount present is insufficient to cause scorching. In general, however, it is preferable to use a single compound.

It is not an essential feature of the invention to use an additive compound which has been prepared by interacting the anhydrous halide and the organic compound, if the additive compound can be prepared in some other way, for instance from a halide compound containing water of crystallisation, the water being removed during or after the reaction with the organic compound.

The following are mentioned as particular additive compounds which have been found to effect cure. The number of molecules of organic compound combined with one molecule of halide is given in brackets. The compounds from zinc chloride and the following bases, acetamide (1), aniline (2), benzidine (1), betaine (2), cyclohexylamine (2), 4:4'-diaminodiphenylmethane (1), di-o-anisidine (1), diphenylguanidine (2), N:N-diphenyl-p-phenylenediamine (2), diphenylthiourea (1 of diphenylthiourea with 2 of halide), 4:4'-dithioureidodiphenyl (3), 4:4'-diureidodiphenyl (1), ethylcyclohexylamine (2), ethylenediamine (1), hexamethylenetetramine (2), melamine (2), phenylbiguanide (1 of phenylbiguanide to 2 of halide), phenylthiourea (1 of phenylthiourea with 2 of halide), quinoline (1), sarcosine (1), thiourea (2), o-tolidine (1), o-toluidine (2), triethanolamine (1) and m-xylidine (2) respectively; the compounds from zinc bromide and ethylenediamine (3), pyridine (2) and thiourea (2); the compounds from antimony trichloride and aniline (3), pyridine (3), quinoline (1) and thiourea (3); the compounds from antimony pentachloride and aniline (3); from antimony tribromide and aniline (3); from aluminium tribromide and aniline (1); from stannous chloride and pyridine (1), and thiourea (2); from stannic chloride and aniline (2), dimethylaniline (2), ethyl cinnamate (2), and pyridine (2); from stannic bromide and cinnamic aldehyde (2); from ferrous chloride and acetamide (2), benzidine (2), 4:4'-diaminodiphenylmethane (2), di-o-anisidine (1) diphenylguanidine (1 of diphenylguanidine with 3 of halide), dithioureidodiphenyl (1), ethylenediamine (2), melamine (1), o-phenylenediamine (2), m-phenylenediamine (2), p-phenylenediamine (2), thiourea (2) and o-toluidine (1); from ferric chloride and thiourea (2); and the compound from boron trifluoride and methyl salicylate (1).

Preferred additive compounds for use in our invention are those from 1 mol. of zinc chloride and 1 mol. of benzidine (Z. Anorg. Allgem. Chem. 1929, 180, 105); 1 mol. of zinc chloride and 1 mol. of ethylenediamine, (precipitated on mixing an aqueous solution of the amino with an alcoholic solution of the chloride), 1 mol. of zinc chloride and 2 mols. of thiourea (Ber., 1876, 9, 172); from 1 mol. of zinc bromide and 2 mols. of thiourea (made in a manner analogous to the zinc chloride-thiourea compound); from 1 mol. of ferrous chloride and 2 mols. of benzidine (made by adding a solution of benzidine in acetone to an aqueous solution of ferrous chloride); 1 mol. of ferrous chloride and 4 mols. of thiourea (Z. Anorg. Chem. 49, 25), and 1 mol. of ferrous chloride and 1 mol. of o-tolidine (made by mixing alcoholic solutions of the two components).

As has already been indicated, additive compounds are preferred, which are derived from organic compounds which are nitrogenous bases, especially aliphatic and aromatic amines, amides and thioamides. Additive compounds derived from other classes of organic compounds, such as acid esters may be used.

The following examples in which parts are by weight illustrate but do not limit the invention.

*Example 1*

The following mixes were compounded in a two-roll rubber mill.

|  | A | B |
| --- | --- | --- |
|  | Parts | Parts |
| Neoprene GN | 100 | 100 |
| Carbon black | 36 | 36 |
| Mineral oil | 5 | 5 |
| Product from 1 mol. of zinc chloride and 2 mols. of thiourea | 3 | |
| Zinc oxide | | 1 |
| Magnesia | | 4 |

The resulting stocks were cured under hydraulic pressure for 30 minutes at 141° C.
The vulcanisates had the following properties:

|  | A | B |
|---|---|---|
| Tensile strength, kg./cm.² | 236 | 204 |
| Elongation, percent | 494 | 580 |
| Modulus at 300% extension, kg./cm.² | 124 | 90 |
| Shore hardness | 64 | 58 |
| Resilience (Tripsometer at 50° C.) | 65.5 | 61.3 |

These figures show that the cure promoted by the additive compound has improved resilience, modulus, hardness and tensile strength.

Example 2

The following mixes were compounded on a two-roll rubber mill.

|  | C | D |
|---|---|---|
|  | Parts | Parts |
| Neoprene GN | 100 | 100 |
| Carbon black | 36 | 36 |
| Mineral oil | 5 | 5 |
| Product from 1 mol. ferrous chloride and 4 mols. of thiourea | 3 |  |
| Zinc oxide |  | 1 |
| Magnesia |  | 4 |

The resulting mixes were cured under hydraulic pressure for 30 minutes at 141° C.
The vulcanisates had the following properties:

|  | C | D |
|---|---|---|
| Tensile strength, kg./cm.² | 208 | 204 |
| Elongation, percent | 413 | 580 |
| Modulus at 300% extension, kg./cm.² | 132 | 90 |
| Shore hardness | 56 | 58 |
| Resilience (Tripsometer at 50° C.) | 65.8 | 61.3 |

These figures show that the vulcanisate prepared using the complex has improved resilience, and modulus.

Example 3

The following mixes were compounded in a Banbury type internal mixer:

|  | E | F |
|---|---|---|
|  | Parts | Parts |
| Neoprene GN | 100 | 100 |
| Carbon black | 36 | 36 |
| Mineral oil | 5 | 5 |
| Product from 1 mol. of zinc chloride and 1 mol. of benzidine | 2 |  |
| Zinc oxide |  | 1 |
| Magnesia |  | 4 |

Portions of the compounded mixes were cured under hydraulic pressure for 30 minutes at 141° C.
These had the following properties:

|  | E | F |
|---|---|---|
| Tensile strength, kg./cm.² | 210 | 204 |
| Elongation, percent | 533 | 580 |
| Modulus, kg./cm.² | 92 | 90 |
| Shore hardness | 53 | 58 |
| Resilience (Tripsometer at 50° C.) | 61.0 | 61.3 |

The scorching properties of these mixes were compared by milling them in a Banbury type internal mixer till scorching took place.

Mix E required 17 minutes and mix F required 9 minutes.

Mix E is therefore much more safe to handle and in this respect has an important advantage over mix F (the conventionally used formula).

Example 4

The following mixes were compounded on a two-roll rubber mill.

|  | G | H | I |
|---|---|---|---|
|  | Parts | Parts | Parts |
| Neoprene GN | 100 | 100 | 100 |
| Carbon black | 36 | 36 | 36 |
| Mineral oil | 5 | 5 | 5 |
| Product from 1 mol. of zinc chloride and 1 mol. of ethylenediamine | 2 |  |  |
| Product from 1 mol. of ferrous chloride and 1 mol. of o-tolidine |  | 2 |  |
| Product from 1 mol. of ferrous chloride and 2 mols. of benzidine |  |  | 2 |

The resulting stocks were cured under hydraulic pressure for 30 minutes at 141° C. The vulcanisates had the following properties:

|  | G | H | I |
|---|---|---|---|
| Tensile strength, kg./cm.² | 183 | 142 | 176 |
| Elongation, percent | 360 | 260 | 373 |
| Modulus at 300% extension, kg./cm.² | 146 |  | 134 |
| Shore hardness | 59 | 62 | 60 |
| Resilience (Tripsometer at 50° C.) | 66.3 | 72 | 65.5 |

Example 5

The following mixes were compounded on a two-roll rubber mill.

|  | J | K |
|---|---|---|
|  | Parts | Parts |
| Neoprene ILS | 100 | 100 |
| Light calcined magnesia | 10 |  |
| Wood rosin | 4 |  |
| Stearic acid | 2 |  |
| Tricresylphosphate | 4 |  |
| Carbon black | 36 | 36 |
| Sulphur | 1 | 1 |
| Zinc oxide | 5 |  |
| Product from 1 mol. of ferrous chloride and 4 mols. of thiourea |  | 2 |

The resulting mixes were cured as follows:

J — 60 minutes at 141° C.
K — 30 minutes at 141° C.

The vulcanisates had the following properties:

|  | J | K |
|---|---|---|
| Tensile strength, kg./cm.² | 230 | 215 |
| Elongation, percent | 470 | 405 |
| Modulus at 300%, kg./cm.² | 115 | 146 |
| Shore hardness | 44 | 61 |
| Resilience (Tripsometer at 50° C.) | 47 | 51.3 |

The use of the curing agent has enabled the time of cure to be halved and at the same time given a product with better resilience, modulus and hardness.

We claim:

1. A process for vulcanizing polychloroprene synthetic rubber in which the major portion of the monomeric material employed in forming said rubber was chloroprene, which comprises incorporating with the unvulcanized chloroprene rubber an addition compound of a halide of an element of the group consisting of aluminum, antimony, boron, cadmium, chromium, cobalt, copper, iron, lead, manganese, nickel, tin and zinc, and a nitrogenous organic base which does not contain a nitrogen-to-nitrogen linkage, the addition compound of said halide and nitrogen base being composed of from 1 to 4 mols of the nitrogenous organic base per mol of the halide, and subjecting the resulting product to vulcanization.

2. A process for vulcanizing polychloroprene synthetic rubber in which the major portion of the monomeric material employed in forming said rubber was chloroprene, which comprises incorporating with the unvulcanized chloroprene rubber an addition compound of equal molecular proportions of zinc chloride and a basic aromatic diamine, and subjecting the resulting product to vulcanization.

3. A process for vulcanizing polychloroprene synthetic rubber in which the major portion of the monomeric material employed in forming said rubber was chloroprene, which comprises incorporating with the unvulcanized chloroprene rubber an addition compound of equal molecular proportions of zinc chloride and benzidine, and subjecting the resulting product to vulcanization.

4. A process for vulcanizing polychloroprene synthetic rubber which comprises incorporating therewith an addition compound of equal molecular proportions of zinc chloride and a basic aromatic diamine, and subjecting the resulting product to vulcanization.

5. A process for vulcanizing polychloroprene synthetic rubber which comprises incorporating therewith an addition compound of equal molecular proportions of zinc chloride and benzidine, and subjecting the resulting product to vulcanization.

6. Vulcanized polychloroprene synthetic rubber obtained by the process of claim 1.

7. Vulcanized polychloroprene synthetic rubber obtained by the process of claim 2.

8. Vulcanized polychloroprene synthetic rubber obtained by the process of claim 5.

WILLIAM BAIRD.
BERNARD JAMES HABGOOD.
DAVID AUGUSTINE HARPER.
JAMES ALLAN HENDRY.